United States Patent
Nomarski et al.

[11] 3,825,348
[45] July 23, 1974

[54] PROCESS OF OPTICAL PATH MODULATION AND MODULATOR FOR IMPLEMENTATION OF THE SAME

[75] Inventors: Georges Nomarski, Villon Bourg-la-Reine; Gérard Roblin, Ivry, both of France

[73] Assignee: Etablissement Public: Agence Nationale De Valorisation De La Recherche Anvar, Neuilly S/Seine, France

[22] Filed: Nov. 27, 1972

[21] Appl. No.: 309,797

[30] Foreign Application Priority Data
Dec. 3, 1971 France .............................. 71.43510

[52] U.S. Cl. ................................. 356/107, 356/113
[51] Int. Cl. ............................................. G01b 9/02
[58] Field of Search ............................ 356/106–113

[56] References Cited
UNITED STATES PATENTS
3,482,919. 12/1969 Barringer ........................ 356/106 S
FOREIGN PATENTS OR APPLICATIONS
1,244,424 5/1965 Germany ............................ 356/113

Primary Examiner—Ronald L. Wibert
Assistant Examiner—Conrad Clark
Attorney, Agent, or Firm—Littlepage, Quaintance, Murphy & Dobyns

[57] ABSTRACT

The invention concerns a process and a device for optical path modulation.

The process lies in modulating the optical path difference between both waves of an interferometer by alternate variation of the relative inclination of two components of the interferometer due to the action of a modulator producing an alternate flexure, in creating a modulated optical phase variation causing a change in the modulated light flux and in using the signal provided by a photo-sensitive receiver submitted to this flux for measuring or detecting a phenomenon producing an optical phase difference submitted to the action of the optical path modulator.

The invention applies to metrology, ellipsometry, refractometry, polarimetry, etc.

11 Claims, 7 Drawing Figures

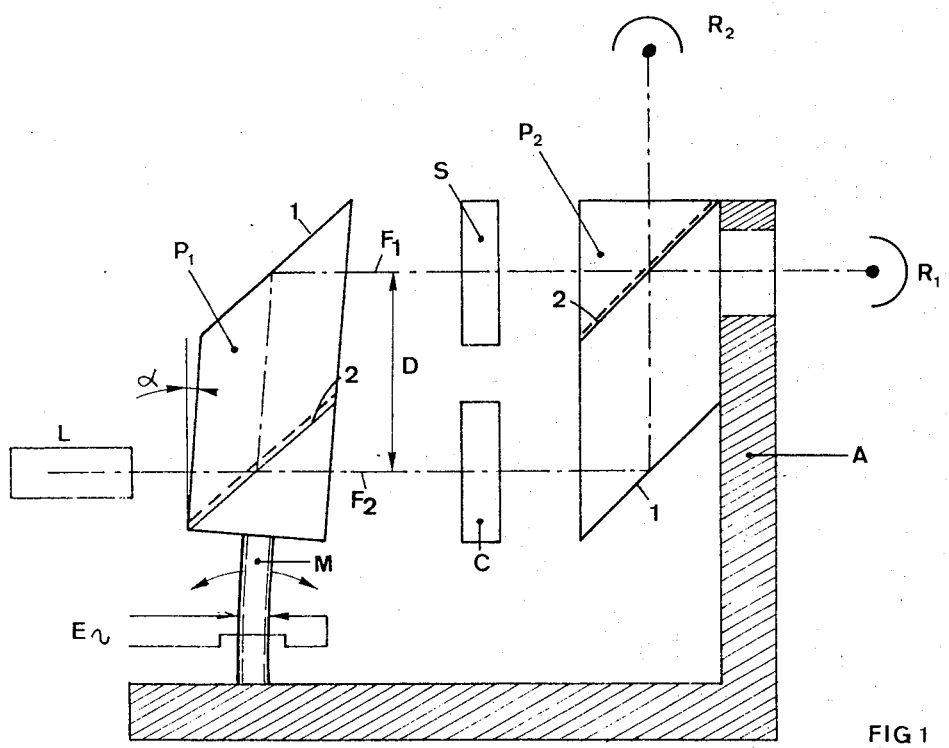
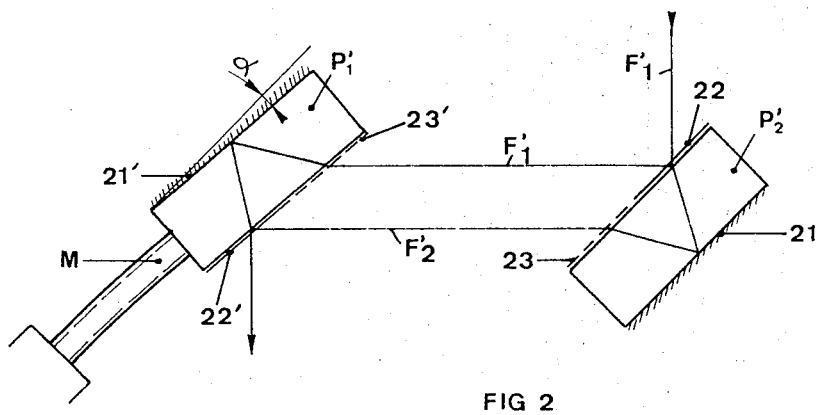
FIG 1
FIG 2

PROCESS OF OPTICAL PATH MODULATION AND MODULATOR FOR IMPLEMENTATION OF THE SAME

BACKGROUND OF THE INVENTION

The invention concerns a process of modulation of optical path of phase, intended to produce a periodic variation of a functioning difference introduced between two optical beams likely to interfere with each other, and an interference modulator for its utilization. The invention concerns the fields of metrology (lengths, angles or displacements), refractometry (measurement of refraction indices), polarimetry and ellipsometry.

There have already been proposed phase modulation processes based on the use of the electro-optical effect in crystals (or Pockels effect), of the magnetic rotary polarization phenomenon (or Faraday effect) or of photoelasticity.

In general, these processes require considerable electric power (at least for Pockels and Faraday effects, which require, respectively, high voltages and currents) and the use of extremely pure synthetic optical materials.

There are also interferometers of the Fabry-Pérot type, where the optical thickness is modulated by the Pockels effect or by displacing one of the mirrors by alternative translation, or of the Michelson type, where the length of one of the arms is modulated by alternative translation of one of the mirrors. However, these devices require very close centering and inclination tolerances.

SUMMARY OF THE INVENTION.

The purpose of the invention is to provide an optical delay modulation device and process not having the above disadvantages, characterized by great service flexibility and great simplicity in use.

For this purpose, the invention provides an optical delay modulation process by changing the difference of the optical paths existing between the two branches of a two-wave interferometer composed of two components, also characterized in that this functional difference is modulated by the angular variation of position of one of the components with respect to the other, this variation being obtained by periodic oscillation, thus creating an optical phase difference, variable and modulated between two light waves, which causes the production of a variable light flux modulated at the outlet of the interferometer, this modulated phase difference or this modulated light flux being used to detect the existence, measure the value, or control the evolution either of optical magnitudes, such as dephasings, optical paths, refraction indices, double refractions, or any other physical magnitude or its variations having an effect on optical magnitudes.

Another purpose of the invention is also a device for the utilization of the process above, including a light source and a two-wave interferometer composed of two components, characterized in that one of the components is fastened to the interferometer frame, the other component being connected to said frame by the intermediary of a mechanical modulator imparting to this component a periodic angular oscillating motion.

According to a first arrangement, the device is characterized in that the interferometer is of the Mach-Zehnder type, composed of two solid components, each including a total reflection mirror and a partial reflection mirror existing in this type of interferometer, in that the light source is monochromatic and in that it includes a photo-sensitive receiver to the light flux emerging from the modulator providing a signal and means of processing and/or interpretation of this signal.

According to a second arrangement, the devic is characterized in that the interferometer is of the Jamin type, composed of two blades with plane parallel faces of transparent isotropic optical material, which faces are suitably treated and can operate in monochromatic light.

According to a third arrangement, the device is characterized in that the interferometer is of the polarization type, consisting of two double-refracting crystals placed between crossed polarizers, able to use a light source which is roughly achromatic or white.

Advangeously, the mechanical modulator is a mono- or poly-crystalline component embedded at one of its ends and fastened at its other end to said interferometer component and subjected to an alternative electric field.

BRIEF DESCRIPTION OF THE DRAWINGS

Other characteristics and advantages will be brought out by the description following the three arrangements above, which is given as an example only and is illustrated by the annexed drawings, on which:

FIG. 1 represents a first arrangement of the interferential modulator according to the invention, using a Mach-Zehnder interferometer;

FIG. 2 represents a second arrangement, using a so-called Jamin interferometer;

DESCRIPTION OF THE PREFERRED EMBODIMENTS

Figure 3:
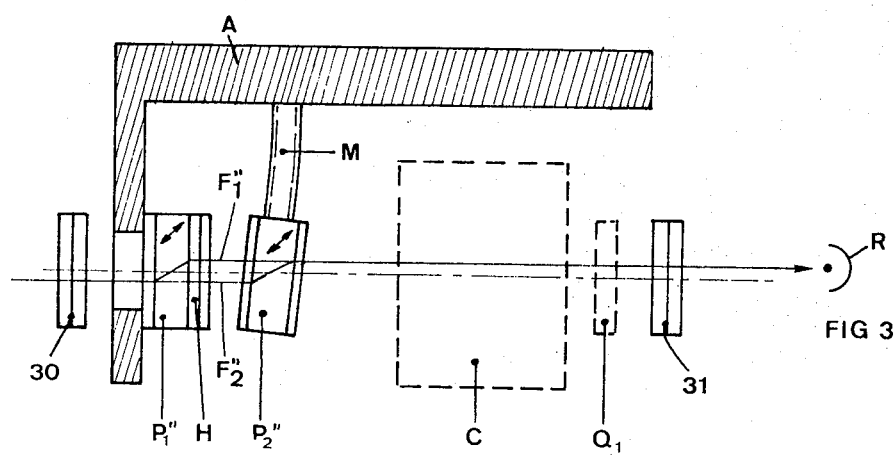
FIG. 3 represents a third arrangement, using a polarization interferometer consisting of two identical blades of a double-refracting crystal, spar for instance.

The invention will be first described in reference to FIG. 1. We will consider a Mach-Zehnder interferometer composed, for instance, of two solid components $P_1$ and $P_2$, each including a total reflection mirror 1 and a partial transmission and reflection mirror 2, and serving as an interface between a single beam (from L or to $R_2$) and a double beam ($F_1$ and $F_2$). The component $P_2$, for instance, is rigidly integral with a fixed part A (interferometer frame) while $P_1$ is integral with it, in accordance with the invention, only by the intermediary of a mechanical modulator M which, through flexure, enables $P_1$ to assume an angular orientation $\alpha$ in the plane of the figure with respect to the component $P_2$, starting with an original position such that the four interferometer mirrors are all parallel. If we use a monochromatic light source such as a laser L, if D is the parallax or doubling distance between the two beams $F_1$ and $F_2$ inside the interferometer and if the adjustment is such that no error of pyramidity (deflect of parallelism between the planes of incidence of components $P_1$ and $P_2$) is introduced by the flexure, the functioning difference $\Delta$ between the two beams $F_1$ and $F_2$ of the interferometer, for a flexural angle $\alpha$, is, in the second order, such that:

$$\Delta = D\alpha$$

If the flexural angle $\alpha$ is modulated periodically in time, following a law, for instance sinusoidal of frequency $f$ with an amplitude $\alpha_o$, it follows that this functioning difference varies periodically in time with the frequency $f$, following the law:

$$\Delta(t) = D\alpha_o \sin 2\pi ft$$

The modulator M producing the flexure $\alpha(t)$ may be any kind of device: mechanical, electro-mechanical or pneumatic for instance. Among these devices, the piezoelectric devices causing flexure by the reverse piezoelectric effect, such as a piezoelectric crystal, quartz for instance, embedded at one of its ends, to the faces of which an alternative electric field E is applied, are advantageous since, by choosing a component with high flexibility, hardness and Curie temperature, excellent stability may be obtained, for motion as well as for the original position. This stability excludes any disadvantage resulting from the choice in the modulation systems, mechanical, electro-mechanical, pneumatic or others, permitting an angular oscillation and used until now. These qualities are improved even more by the use of double-blade components consisting of prepolarized, poly-crystalline ferro-electric ceramics, the crystals of which possess the property of changing dimensions under the action of an electric field, thus causing an effect analogous to the reverse piezoelectric effect.

In such an experiment, the phase difference $\Delta\phi$ introduced between the two beams is $\Delta\phi = 2\pi\Delta/\lambda$ where $\lambda$ is the wave length of the light used. This phase variation is therefore a periodic variation in time, for instance according to the law:

$$\Delta\phi(t) = (2\pi D\alpha_o)/\lambda \sin 2\pi ft$$

At the interferometer outlet, assuming that, at the origin of the motion, the interferometer is adjusted for zero difference of the optical paths (subtractive interferences), the signal supplied by a receiver $R_1$, sensitive to the light flux, will be periodic in time and will have the form:

$$S_1(t) \, S_o \sin^2(\Delta\phi(t)/2) = (S_o/2)\{1-\cos[(2\pi D/\lambda)\alpha_o \sin 2\pi ft]\}$$

If the receiver $R_1$ is of the photoelectric type, the current produced is then a periodic modulated current with fundamental frequency equal to double the fundamental modulation frequency.

The modulation depth of this signal is maximum or total when the modulation amplitude of the optical delay $\Delta_o$ equals one wave half-length, i.e.:

$$\Delta_o = D\alpha_M = \lambda/2.$$

Such an instrument, called interferential modulator, is therefore very sensitive and this total modulation is obtained for a flexure amplitude of the modulator $\alpha_M = \lambda/2D$. The modulation amplitude varies in reverse proportion to the doubling distance D of the beams $F_1$ and $F_2$ inside the interferometer. Therefore this modulation amplitude is very small and, for a wave length of 633 nm, it is on the order of one-tenth of minute of an arc for a doubling distance of 10 mm. One can see there the great advantage of this optical delay modulator, which produces total modulation of the light wave for an extremely small flexure amplitude of the modulator.

Another advantage results from the fact of the functioning difference $\Delta$ introduced into such an interferometer being stationary in function of the angle of incidence of the light beam and, in addition, the phenomenon is insensitive to a distance variation between the two components, which permits quite wide tolerances on the inclination of the light beams.

This instrument is perfectly adaptable to measurement or detection of optical dephasings. Let us assume that on one of the interferometer arms is placed an optical object S introducing an optical delay resulting in a phase shift $\phi_S$ and that on the other arm is placed an optical compensator introducing an adjustable variable optical delay resulting in a phase shift $\phi_o$. The signal provided by the receiver $R_1$ is then in the form:

$$S_1(t, \phi_S) = S_o/2 \{1-\cos[(2\pi D/\lambda)\alpha_o \sin 2][ft + \phi_S-\phi_o]\}$$

If the receiver is of the photoelectric type, this signal produces a fundamental frequency-modulated electric current equal to the modulation frequency of the modulator. The amplitudes of the odd components of this signal are cancelled when the variable measurable phase shift $\phi_o$ is equal to the unknown phase shift $\phi_S$, whence a means arises for measuring such a phase shift.

The interference modulator according to the invention offers still another advantage in that the Mach-Zehnder interferometer possesses two optically dephased output of $\pi$. If these two outputs are directed to the two receivers $R_1$ and $R_2$, the treatment of the two equal signals respectively at:

$$S_o \sin^2[\Delta\phi(t) + \phi_S-\phi_o]/2$$

and $S_o \cos^2[\Delta\phi(t) + \phi_S- \phi_o]/2$ and their composition permits other applications, such as sign determination, recording, counting, etc. This also permits one to obtain two total modulation outputs or partial modulation outputs phase shifted in time of $T/4$ if $T$ is the modulation period of the flexure modulator.

If the doubling distance is quite small, it will be possible to detect or measure a slope variation of the optical delay, introduced by an object placed simultaneously on the two arms of the interferometer. Now, it is difficult in practice to build a Mach-Zehnder interferometer with small doubling. Furthermore, in addition to this application, it is advantageous to reduce the doubling so as to reduce the instrument sensitivity also, which easily becomes too great. This permits the use of a much larger flexure amplitude: a few minutes instead of a few angular seconds, which facilitates the operation of the mechanical modulator.

FIG. 2 illustrates a second means of obtaining an interferential modulator according to the invention, of the Jamin type, composed of two blades or plates with plane parallel faces $P'_1$ and $P'_2$. In this version, the blade $P'_2$ is fixed while the blade $P'_1$ is, in accordance with the invention, made integral with the interferometer frame by the intermediary of the modulator M. In this case, for a beam F' incidence of close to 45°, the doubling between the two beams $F'_1$ and $F'_2$ is on the order of two thirds of the thickness of each of the blades and, in practice, one can easily obtain a doubling 10 times less than with a Mach-Zehnder interferometer. Beginning with a motion origin corresponding to the parallel blades, position for which the functioning difference between the two beams is zero, a flexure causing an inclination $\alpha$ of one of the blades with respect to the other, creates between the two beams $F'_1$ and $F'_2$ a functioning difference approximately equal to $D\alpha$. To improve the efficiency of the system, one may impart to the blades $P'_1$ and $P'_2$ reflecting treatments 21 and 21' on their outer faces, semi-reflecting treatments 22 and 22' on half their inner faces, the other half receiving anti-reflection treatments 23 and 23', as shown on FIG. 2.

Another production means, schematized by FIG. 3, uses a polarization interferometer and also permits one to obtain small doubling between the two beams. In this production method, the interferometer may consist of two parallel-face blades $P''_1$ and $P''_2$, of the same thickness as a uniaxial double-refracting crystal for instance, of which the axis is at 45° from the faces. One of the blades ($P''_1$) is fixed and the other ($P''_2$) is connected to the interferometer frame A by the intermediary of the modulator M. This assembly is placed between two crossed polarizers 30 and 31, oriented at 45° from the plane containing the axis of the blades, which enables the two beams doubled by the first blade $P''_1$ and recombined by the second blade $P''_2$, to interfere with each other. If the axes of the two blades are parallel and if a half-wave plate H with axes oriented at 45° from the plane containing the crystal axes is introduced, which enables the interferometer opening angle to be increased, the functioning difference between the two beams $F''_1$ and $F''_2$ is zero when the two blades $P''_1$ and $P''_2$ are parallel. Between the two interferometer components, the doubling of the two beams is approximately:

$$D = e(n_e^2 - n_o^2)/(n_e^2 + n_o^2)$$

where $e$ is the thickness of each blade $P''_1$ and $P''_2$ and where $n_e$ and $n_o$ are respectively the extraordinary and ordinary refraction indices of the crystal used. In the case of calcite or Iceland spar, for a medium wave length of the visible spectrum, the doubling is on the order of one-tenth of the thickness. It remains stationary in function of the beam incidence close to the normal incidence and also in function of the light wave length. This very small doubling permits differential interferometry experiments by placing between the two interferometer components a sample with phase varying in the direction of the doubling.

An inclination $\alpha$ of one of the blades with respect to the other, due to the flexure produced by the modulator M, introduces between the two beams $F'''_1$ and $F'''_2$ a functioning difference $\Delta = D\alpha$, which is modulated at the modulator frequency. Like for the previously described production methods, the light flux at the outlet of the interferential modulator is modulated totally for a flexural amplitude $\alpha_M$ so that $D\alpha_M = \lambda/2$ i.e., $\alpha_M = \lambda/2D \# 10\lambda/2 e$. This flux is modulated at the fundamental frequency $2f$ if $f$ is the flexural modulation frequency. It may also be modulated at a pseudofrequency $2Kf$ with a flexural modulation amplitude $\alpha_K$ so that $\alpha_K = K\alpha_M$, the successive deviations with time between the zero minima within the successive duration periods $1/2f = T/2$ being equal to:

$$t_n = \begin{cases} \dfrac{T}{2\pi}\left(\sin^{-1}\dfrac{n}{K} - \sin^{-1}\dfrac{n-1}{K}\right) & \text{for } 1 \leq n \leq K \\ \dfrac{T}{2\pi}\left(\sin^{-1}\dfrac{2K+1-n}{K} - \sin^{-1}\dfrac{2K-n}{K}\right) \\ & \text{for } K+1 \leq n \leq 2K \end{cases}$$

The interferential modulator working in polarized light may be applied to the study of a phenomenon C, the effects of which are translated by an optical phase shift, having as consequence the transformation of the rectilinearly polarized vibration by the polarizer 30 into an elliptical vibration. A quarter-wave plate $Q_1$, with one of its axes parallel to that of the polarizer 30, permits to transform this vibration into a rectilinear vibration of which the orientation depends on the phase shift value. Only a rotation of the polarizer-analyser 31, equal to one-half of this phase shift, permits the cancellation of the odd components of the modulated signal provided by the receiver R, which permits this phase shift to be measured, whence the measurement of the physical variable having produced this phase shift: length variation, index variation, variation of the double refraction possibly caused by variations of other physical or chemical magnitudes, such as temperature, pressure, electric or magnetical field, time, concentration, etc.

As a non-limitative example, we will give the characteristics of an interferential modulator obtained according to the diagram of FIG. 3. The interferometer consists of two calcite blades of square section 1 cm, on the side and 3 mm thick, a cloven mica half-wave plate being glued on the fixed blade and each of the two assemblies being protected by two glued glass blades 1mm. thick. Under these conditions, the angular modulation amplitude necessary to produce an optical delay modulation of an amplitude equal to a wave half-length is on the order of 3.4 minutes of arc. The flexural motion is produced by a two-blade component of prepolarized, poly-crystalline, ferro-electric ceramic, embedded in one of its ends and supporting the movable component at the other end, with a free length of about 35mm. One may, for instance, use a ceramic of the type called "BIMORPH" PZT 5B manufactured by the Brush-Clevite Co. Equipped with this mechanical load, the resonance frequency of this system is experimentally equal to 54 cycles per second and the flexural amplitude necessary for total modulation requires the application to the electrodes of this ceramic a peak to peak 4.5 V voltage, the electric power consumed being on the order of 20 microwatts.

We thus obtain an optical delay modulator working in low frequency and at very low power, which distinguishes it from the known type of modulators working at high frequency and, in general, requiring quite high powers or voltages. The frequency may be increased either by working on resonance frequencies of a higher order, or by shortening the free length of the ceramic blade. In this way, vibration frequencies on the order of 1 kilocycle may be obtained easily.

Figure 4:
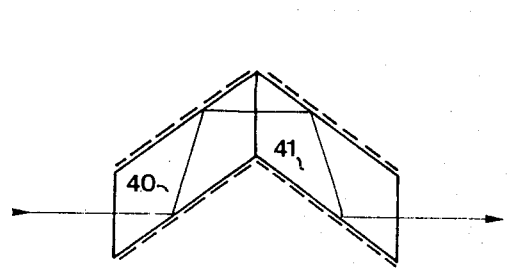
FIG. 4 represents an achromatic equivalent half-wave plated used in the device of FIG. 3, composed of total reflection prisms.

A disadvantage of the system described above is due to the fact that the half-wave plate used is not achromatic. To remedy this, it is possible, in accordance with FIG. 4, to use an achromatic half-wave system composed of two rhombohedral prisms 40 and 41, called Fresnel prisms, in which the beam is subjected to four total reflections at an incidence on the order of 54° if the prisms are in glass with refraction index of 1.52.

The achromaticity may be improved even more by depositing suitable thin coats on the faces where the beam undergoes total reflection.

Figure 5:
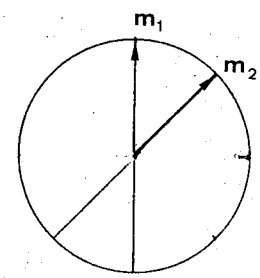
FIG. 5 represents another half-wave plate system used in FIG. 3, consisting of a stack of half-wave plates

It is furthermore possible, in accordance with FIG. 5, to constitute an achromatic half-wave system by stacking of half-wave plates for a medium wave length, of which the slow axes $m_n$ are suitably oriented, the achromaticity improving as n increases.

Another advantage of this interferential modulator using a polarization interferometer is the possibility of causing a polarization plane to oscillate periodically with a large amplitude.

Figure 6:
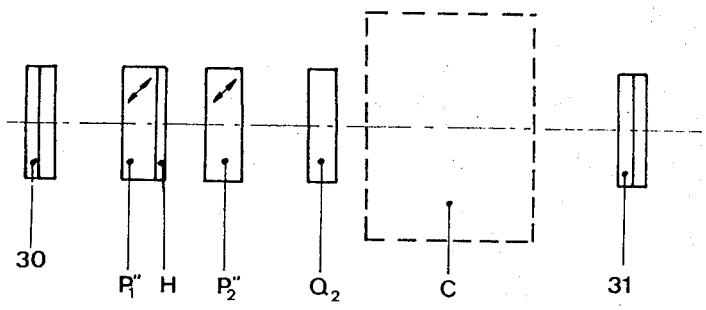
FIG. 6 represents an arrangement of the interference modulator shown in FIG. 3, permitting modulation of the orientation of a direction of polarization with very high angular amplitude.

The incident light wave polarized rectilinearly by the polarizer 30 is transformed into an elliptical wave at the outlet of the second component $P''_2$. If one places, in accordance with FIG. 6, a quarter-wave plate $Q_2$ (which may be achromatic) with one of its axes parallel to the direction of the polarizer 30, this elliptical wave is transformed into a rectilinear vibration making an angle $\Delta\phi(t)/2$ with the direction of the polarizer 30 if $\Delta\phi(t)$ is the phase variation introduced by the interferential modulator. For a very small flexure amplitude, on the order of a few minutes of arc and causing an optical delay periodic variation of the amplitude $\lambda/2$, the phase variation has an amplitude of $\pi$ radians and we thus obtain a periodic oscillation of the polarization plane of an amplitude $\pi/2$. This possibility, which may also be applied to the interferential modulators of FIGS. 1 and 2, of modulating a polarization plane with an amplitude being able to be so high is very advantageous in polarimetry and ellipsometry. Conversely, this rotation amplifying effect may permit, for instance, the determination of the flexure constants of a mechanical modulator with extremely high accuracy.

This interferential modulator, using an interferometer in which the two waves are polarized perpendicularly, permits also to modulate the light flux at the interferometer outlet at the same frequency as that of the modulator component.

In fact, we have seen previously that one of the properties of the interferential modulator was to modulate the light flux at its outlet with a frequency double that of the modulator if no dephasing object is placed inside the interferometer and if at the modulation origin, the interferometer configuration is such that the phase shift between the two waves is zero.

Figure 7:
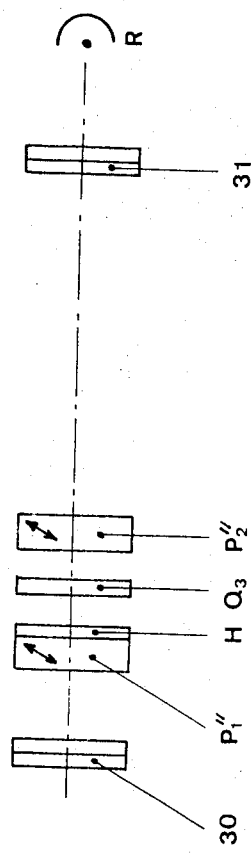
FIG. 7 represents an arrangement of the interference modulator shown in FIG. 3, permitting production of a variable light flux at the outlet of the interferometer, this flux being modulated at the frequency of the modulator.

If we place, in accordance with FIG. 7, between the components $P''_1$ and $P''_2$ of the interferometer a quarter-wave plate $Q_3$ with its axes parallel to the polarization directions of the two waves, the effect of this is to introduce a phase shift of $\pi/2$ between these two waves. Under these conditions, the signal produced by the receiver R is of the form $S(t) = S_o/2 \{1 + \text{Sin } [(2 \pi D/\lambda) \alpha_o \text{ Sin } 2 \pi ft ]\}$ This signal is modulated, its fundamental frequency being the same as that of the modulator.

The modulation depth of this signal is maximum or total when the optical delay modulation amplitude $\Delta_o = D\alpha_o$ equals one-quarter wave, i.e.:

$\Delta_o = D\alpha_p = \lambda/4$

One can see the great advantage of this device, which produces a total modulation of the light wave with a modulator flexure $\alpha_p = \lambda/4D$, two times smaller than that, already very small, $\alpha_M = \lambda/2D$ which has been found in the absence of the quarter-wave plate.

What we claim is:

1. In a two-wave interferometer, comprising:
   A. a frame,
   B. first and second single-beam/double-beam interface components,
   C. means for fixedly attaching the first component to the frame,
   D. means for attaching the second component to the frame,
   E. means for directing a beam of light at a single-beam face of one of the interface components, thereby causing a double beam from a double-beam face of said one of the interface components to be directed along a path to a double-beam face of the other of the interface components, and
   F. means for utilizing a resulting interferometer output beam from a single-beam face of said other of the interface components,
   the improvement providing a modulator of the length of said path for the interferometer comprising:
   G. mechanical modulator means for causing a periodic angular oscillating motion by the second interface component with respect to the frame for producing corresponding periodic differences in the length of said path.

2. A device according to claim 1, wherein the interferometer is of the Mach-Zehnder type, wherein each of the two interface components comprises a total reflection mirror and a partial reflection mirror, said one interface component receiving its single beam input on its partial reflection mirror to split the beam into a double beam, a reflected part of the split beam being again reflected on the total reflection mirror of said one interface component toward the partial reflection mirror of said other interface component, the transmitted portion of the split beam from the partial reflection mirror of the one component being reflected by the total reflection mirror in the other component toward the partial reflection mirror in the other component, there to generate a reunited interferometer output beam, and wherein the means for directing a beam of light provides monochromatic light.

3. A device according to claim 2, further comprising
   A. a device to be studied placed in the path of one beam of the double beam, and
   B. an optical compensator placed in the path of the other beam of the double beam.

4. A device according to claim 1 wherein the means for utilizing is a photo-sensitive receiver.

5. A device according to claim 4 further comprising a second single-beam face of said other component for providing a second output beam, phase shifted with respect to said interferometer output beam, and a second photo-sensitive receiver for utilizing the second output beam.

6. A device according to claim 1, wherein the interferometer is of the Jamin type, wherein each interface component comprises a plate of transparent isotropic optical material.

7. A device according to claim 1, wherein the interface components comprise double-refracting crystal means for converting between one beam and two beams by double refraction, and wherein the crystal means are placed between crossed polarizer means for translating the angular oscillating motion of the second interface component into an elliptical vibration of polarized light passing through the double-refracting crystal means.

8. A device according to claim 7, wherein the means for directing a beam provides achromatic light.

9. A device according to claim 7, wherein the double-refracting crystals are separated by a half-wave plate.

10. A device according to claim 1, wherein the interferometer contains two polarized waves which are polarized perpendicularly, and a quarter-wave plate is placed between the two interface components to modulate the light leaving the interferometer at a modulation frequency which is the same frequency as that of the periodic angular oscillating motion of the mechanical modulator and to divide by two the oscillation amplitude, thereby permitting total modulation.

11. A device according to claim 1 characterized in that the mechanical modulator is a crystalline component fixed at one of its ends to the frame and fastened at the other end to said second interface component and subjected to an alternative electric field.

* * * * *

UNITED STATES PATENT OFFICE
CERTIFICATE OF CORRECTION

Patent No. 3,825,348　　　　　　　　Dated July 23, 1974

Inventor(s) GEORGES NOMARSKI & GERARD ROBLIN

It is certified that error appears in the above-identified patent and that said Letters Patent are hereby corrected as shown below:

Column 4, line 30, the equation should read:

$$S_1(t, \phi_S) = \frac{S_o}{2} [1-\cos(\frac{2\pi D}{\lambda} \alpha_o \sin 2\pi ft + \phi_S - \phi_o)]$$

Column 7, line 65, the equation should read:

$$S(t) = \frac{S_o}{2} [1 + \sin(\frac{2\pi D}{\lambda} \alpha_o \sin 2\pi ft)]$$

Signed and sealed this 3rd day of December 1974.

(SEAL)
Attest:

McCOY M. GIBSON JR.　　　　　　　C. MARSHALL DANN
Attesting Officer　　　　　　　　Commissioner of Patents